United States Patent

Oppermann et al.

[15] 3,648,007
[45] Mar. 7, 1972

[54] DEVICE FOR THE CONTINUOUS LONGITUDINAL SEAM WELDING OF TUBES

[72] Inventors: Willi Oppermann, Duisburg; Egon Schonitz, Rheinhausen; Werner Wagner, Homberg, all of Germany

[73] Assignee: DEMAG Aktiengesellschaft, Duisburg, Germany

[22] Filed: May 7, 1970

[21] Appl. No.: 35,386

[30] Foreign Application Priority Data

May 7, 1969 Germany......................P 19 23 241.8
Mar. 13, 1970 Germany......................P 20 11 927.1

[52] U.S. Cl..................219/59, 219/121 EB, 219/125 R, 228/45
[51] Int. Cl....................................................B23k 31/06
[58] Field of Search................219/124, 125, 126, 59, 60, 219/61, 121 EB; 228/45, 9

[56] References Cited

UNITED STATES PATENTS

| | | | |
|---|---|---|---|
| 3,135,857 | 6/1964 | Von Voros | 219/125 |
| 3,171,071 | 2/1965 | Brown | 219/125 X |
| 3,267,570 | 8/1966 | Winkler | 29/407 X |
| 3,360,177 | 12/1967 | Enkvist | 219/59 X |
| 3,426,175 | 2/1969 | Hahne | 219/125 |
| 3,448,280 | 6/1969 | Blitchington, Jr. et al | 219/121 L UX |

*Primary Examiner*—J. V. Truhe
*Assistant Examiner*—L. A. Schutzman
*Attorney*—McGlew and Toren

[57] ABSTRACT

A device for the continuous longitudinal seam welding of tubes particularly by electron beam welding, includes a pair of opposed rollers arranged with their mating groove portions in opposition on a bracket which may be rotated so as to shift the rollers in transverse directions. The arrangement includes means for scanning the strip edges of a sheet material which is fed and formed into the form of a slotted tube and adjusting the edges so that the tube is fed between the rollers with the longitudinal groove or slot centered therebetween. The scanning elements are arranged along the strip edges to be welded and actuate a control for a motor which is employed for shifting the grooved rollers with the tube in order to control the position of the weld seam for the purpose of centering the seam in respect to the electron beam. In a preferred arrangement the workpiece is guided by pressure rolls arranged on respective opposite sides of the workpiece which are advantageously carried on a rocker arm so that they may be jointly pivoted about the axis of the workpiece. A second pressure roll pair for guiding the workpiece is advantageously arranged on the rocker arm at a location between the contactless scanning device and the welding pressure roll pair. The second pressure roll pair forces the two band edges of the sheet to be formed firmly together and firmly grips the workpiece running therebetween in the same manner as the welding pressure roll pair.

7 Claims, 7 Drawing Figures

Patented March 7, 1972

INVENTORS
WILLI OPPERMANN
EGON SCHÖNITZ
WERNER WAGNER

By

Malcolm & Toren
their ATTORNEYS

Patented March 7, 1972

INVENTORS
WILLI OPPERMANN
EGON SCHÖNITZ
WERNER WAGNER

By McGlew & Toren
their ATTORNEYS

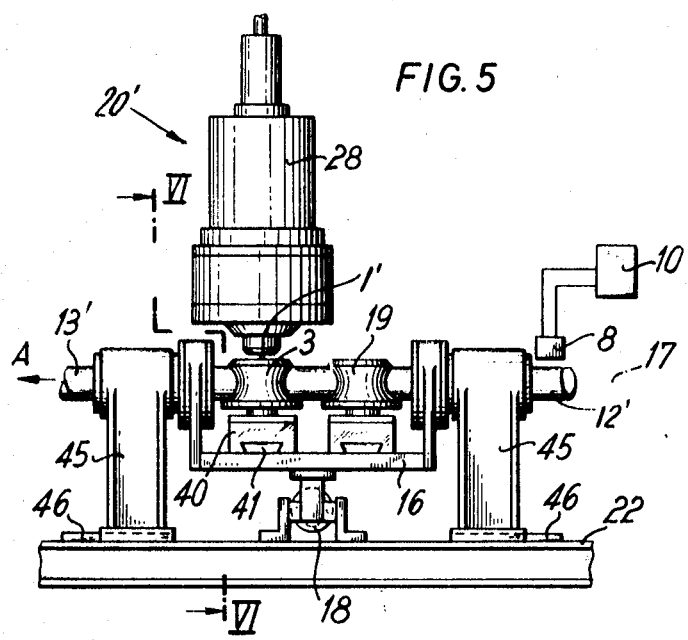
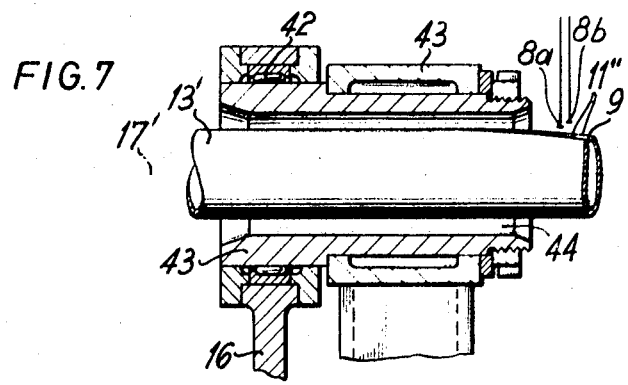
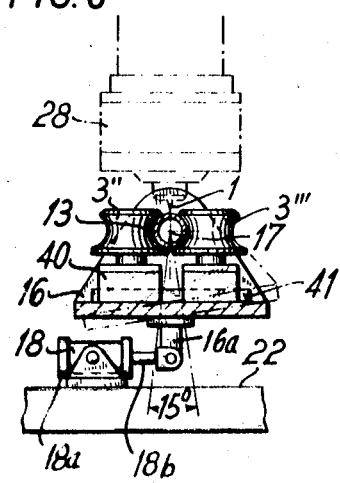
INVENTORS
WILLI OPPERMANN
Egon SCHÖNITZ
Werner WAGNER
By
*McGlew & Toren*
their ATTORNEYS

DEVICE FOR THE CONTINUOUS LONGITUDINAL SEAM WELDING OF TUBES

SUMMARY OF THE INVENTION

This invention relates in general to welding apparatus and in particular, to a new and useful continuous longitudinal seam welding device for welding tubes by means of an electron beam welding with improved means for centering guiding rollers for the sheet material which may be shifted so as to center the seam in relation to the electron beam.

The invention particularly relates to the longitudinal seam welding of tubes by electron beam welding and to an improved apparatus for guiding the edges of the strip used for the manufacture of the tube so that the seam may be centered in respect to a focused electrical energy of the beam welder in order to form a seam of relatively small cross section at the welding point. It is know for such purpose to use guiding tongues or guide rollers for the guidance of the slotted tube forming sheet. Each guide tongue naturally slides along the edges of the strip and can therefore easily damage it. The friction caused thereby also has a detrimental effect and such damage leads to welding faults. In addition, the accuracy of the forced guidance is in the range of millimeters. Because the area cross section of the electron beam for welding purposes is very small most accurate guidance of the sheet material and the longitudinal seam is important.

In accordance with the present invention, means are provided for controlling the welding point without danger of damaging the strip edge in such a manner that a deviation from the centerline can be regulated immediately and most accurately in order to provide a precise centering of the abutting edges of the formed sheet material for the purpose of applying a longitudinal welding seam by an electron beam.

The workpiece may be moved laterally about a pivot axis of the bracket which may be arranged parallel to the workpiece axis to permit the pressure rollers to counteract any migration of the band edges during the welding process. In the longitudinal seam welding of relatively thick-walled tubes, especially those with a large diameter, difficulties will occur because, during the regulation of the band edge migration, the workpiece axis is pivoted out of the plane of the electron beam. Thus, the band edge faces, which are pressed together by the welding pressure rolls and directed radially toward the workpiece axis, are inclined the more, in relation to the electron beam, the greater the pivotal bracket movement necessary for pivoting the pressure rollers for the necessary amount to effect the correction of the seam run. As the electron beam is extremely narrow in many cases, for example, if the welding edge plane is inclined in relation to the electron beam by 5° to 7°, an equally good welding from the outside inwardly is no longer insured.

The present invention provides a mounting for pressure forming rollers for pivotal movement about an axis which corresponds to the workpiece axis in order to provide a simple means for insuring that the weld seam remains uninfluenced even with the correction of a maximum longitudinal seam migration which generally amounts to up to ±7.1/2°. By mounting the pressure rollers so that they can be pivoted about the workpiece longitudinal axis, the workpiece can be rotated about the longitudinal axis by the rollers by the same degree of the seam or band edge migration but in an opposite direction of rotation. Thus, the welding will be uninfluenced by the degree of seam migration and the workpiece axis will always lie in the plane of the electron beam. In addition, the exterior as well as the interior seam edges will always stay in this plane, so that even at a relatively great seam migration the quality of the thick weld seam will remain the same as would be the case with an exact centering of the seam.

The simple apparatus for mounting the pressure rolls for pivotal movement about the axis of the workpiece comprises a rocker arm construction having end hub-portions or bosses which are pivotable about the longitudinally spaced supporting pedestal journals on an axis which corresponds to the axis of the workpiece. In this case, a second pressure roll pair for guiding the workpiece is advantageously arranged on the arm between the welding pressure roll pair and the scanning device or centering means for locating the edges of the sheet which is to be formed into the tube. This second pressure roll pair lays the two band edges against one another and firmly grips the workpiece running through in the same manner as the welding pressure roll pair, the combined roller action being such that it rotates the workpiece back into the required position with certainty even at great seam migration.

The pivoting of the rocker arm which supports the two sets of rollers is advantageously accomplished by a hydraulic drive, which can be controlled accurately and very quickly. The device insures satisfactory weld seams even at great working speeds which, with todays machines extend to about 20 meters per minute.

An object of the invention is to provide an improved welding device which includes means for scanning the position of two opposite edges of a rolled sheet which is fed between forming rollers or pressure rollers, the rollers being mounted on a rocker arm together with at least one other roller set and being movable with the rocker arm for pivotal movement about an axis corresponding to the axis of the workpiece in order to maintain a centering of the edges in respect to a welding device.

Accordingly, it is an object of the invention to provide an improved welding device which includes means for scanning the position of two opposite edges of a rolled sheet which is fed between forming rollers and for actuating a motor control in accordance with the sensed information for shifting the two rollers in order to maintain a centering of the edges in respect to a welding device.

A further object of the invention is to provide a welding apparatus which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 5 is a front view of another embodiment of the invention;

FIG. 6 is a section taken along the line VI—VI of FIG. 5; and

FIG. 7 is a longitudinal sectional view for the portion of the rockers for the roller sets indicated in FIG. 5.

GENERAL DESCRIPTION OF THE PREFERRED EMBODIMENTS

Figure 1:
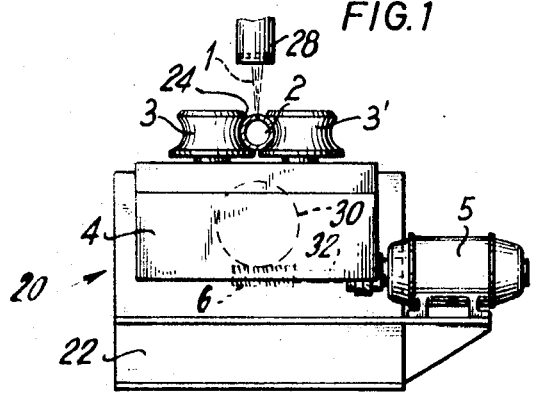
FIG. 1 is a front elevational view of a tube-forming and tube-welding machine constructed in accordance with the invention.
Figure 2:
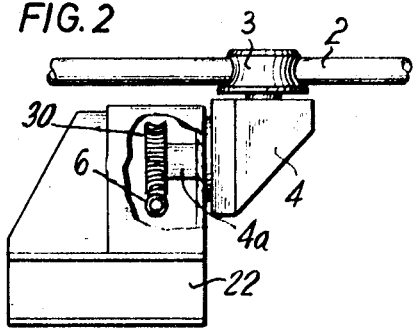
FIG. 2 is a side elevational view of the machine shown in FIG. 1.
Figure 3:
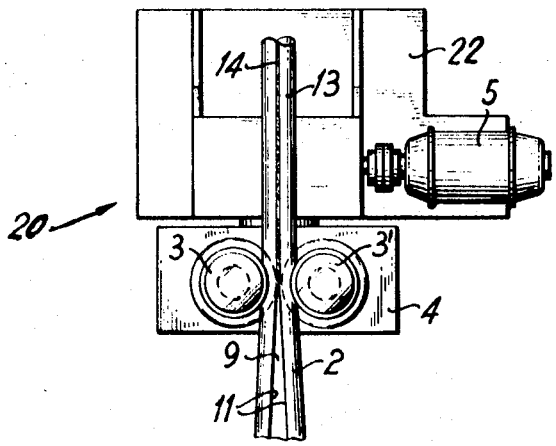
FIG. 3 is a top plan view of the machine.

Referring to the drawings in particular, the invention embodied therein comprises a welding device generally designated 20 which includes a table or stand 22 having spaced forming and deflecting rollers 3 and 3' rotatably mounted thereon for rotation about substantially vertical axes at locations to define a tube engaging nip 24 therebetween. A sheet material 12 is formed by forming means (of which only rollers 3, 3' are shown) into a slotted cylinder 2. The cylinder 12 includes edges 11 which bound a longitudinally extending slot 9 which is centered in the nip 24 between the rollers 3 and 3'. The slot 9 is advantageously centered at a location directly beneath an operating welding part such as an electron beam 1 of a welding device 28.

In accordance with a feature of the invention, the rollers 3 and 3' are supported for rotation on a roller bracket 4 which has a journal portion 4a having a gear 30 which is secured thereto and which is in meshing engagement with a driving helical gear 6 affixed to a shaft 32 of a driving electric motor 5 which is mounted on a support 34 of the base 22.

In accordance with the invention sensing and control means in the form of a scanner or sensing element 8, a control device such as a data processing unit 10 and the electric motor 5 are provided for accurately controlling the position of the rollers 3 and 3' in respect to a selected centerline position so that the slotted cylinder 2 may have its slotted seam 9 centered in the nip 24 below the electron beam 1 continuously during the welding operation.

The electrically energized sensors such as photocell elements 8a, 8b of the scanner 8 are arranged over the slot 9 of the slotted cylinder 2, and they are located to indicate any variations in centering between the two opposite edges 11, 11' of the slotted cylinder during the feeding of the slotted cylinder into the nip 24 between the rollers 3 and 3'. A preselected distance such as the distance a is maintained between the sensors and the edges 11, 11' and 3' measured reactions of the sensors are fed to the control unit or data processing unit 10. The control 10 is arranged so that the shifting of the edges into a position at which they are picked up by one or the other of the sensors which provide an electrical control pulse to the motor 5 to drive the motor in a direction and an amount to produce a rotation of bracket with the forming rollers 3 and 3' by an amount to restore the slotted cylinder 2 to a centered position in respect to the welding device 28.

METHOD OF OPERATION operation:

A sheet of material 12 is fed in a direction of the arrow A and its sides are formed inwardly to form a cylindrical element 2 having a longitudinally extending slot 9. The cylindrical slotted tube 2 is fed between the rollers 3 and 3' and the slot 9 is centered in respect to a welding device 28 so that an electron welding beam 1 may be precisely positioned in respect to the edges 11, 11'. The cylindrical member 2 is pressed together and it is welded along the seam line 14 to form a finished tube 13. During the welding process the electron beam 1 is always centered above the slot 9 and forms a continuous seam line 14. The measuring sensors 8a and 8b are maintained at a distance a away from the respective strip edges 11 and 11'. If there is deviation of the seam 14 to the left or the right from the given centerline, the distance a between the strip edges 11 or 11' and the measuring sensors 8a or 8b is increased or decreased respectively. The sensors therefore transmit this measured increase or decrease with respect to a nominal preselected condition to the control unit 10 which in turn directs the motor 5 to run in a direction and in an amount to shift the forming rollers 3, 3' until the seam line 14 is again in the middle between the welding pressure rollers and exactly centered under the electron beam 1.

In the embodiment of the invention indicated in FIGS. 5 to 7, there is provided welding means generally designated 20', which includes an electron gun or welding device 28 which produces an electron beam 1', below which there is moved a workpiece 12' as in the other embodiment. The workpiece 12' is formed into a tube with a longitudinally expending seam 13' as it is guided between a part of pressure welding rolls 3" and 3"', which act to press the band edges 11", 11' against one another at the welding point. The welding pressure roll 3" and 3"' are arranged on a rocker 16 which is pivotable about a longitudinal axis 17' of the tube 13'. The pivotal movement which, according to the usual seam migration may be up to approximately 15°, is effected by means of a hydraulic power device 18, which includes a fluid pressure cylinder 18a and a piston having a rod portion 18b which is slidable inwardly and outwardly and which connects the rocker 16 through a lever 16a. The end position of the rocker 16 is shown in dotted lines to the right of FIG. 6. In the same position the rocker is pivoted to the right by 7.1/2°.

Figure 4:
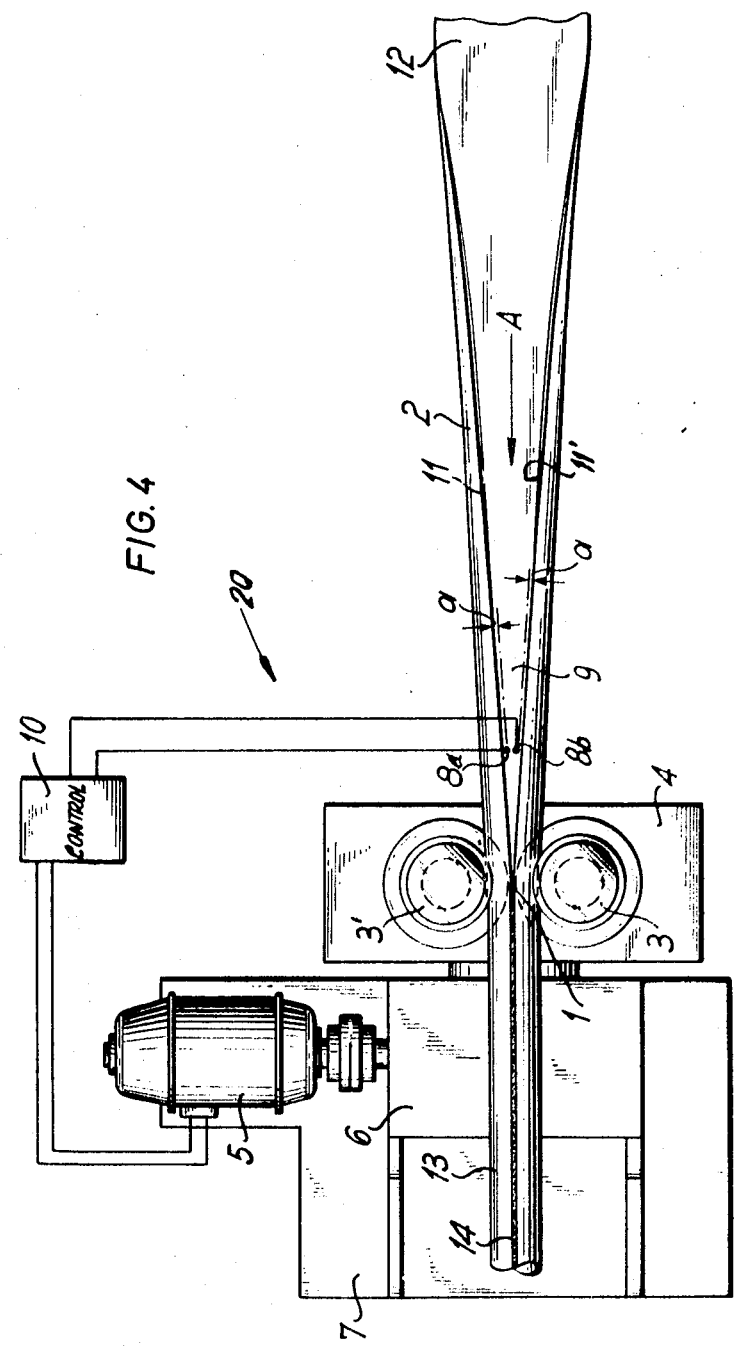
FIG. 4 is an enlarged somewhat schematic top plan view indicating the sensing device constructed and arranged in accordance with the invention.

The hydraulic power device 18 is connected to the scanning means with a controlling device such as the elements 8 and 10 of the embodiment of FIG. 4. The controlling movement is controlled by the scanning elements 8a and 8b as shown in FIG. 4, which are located on each side of the slots 9 in a position above the slot. They transmit the data of the slot course relative to the ideal of central run continuously to the data processing system 10 as shown in FIG. 4 and this controls the power device 18.

The rotation of the rocker 16 with the pressure forming rollers 3" and 3"' causes the workpiece to be twisted about its longitudinal axis 17 in the same proportion of movement as the instantaneous seam migration but in the opposite direction of rotation. In order to insure that this rotatable movement of the rollers occurs reliably at all times the rollers are mounted on the rocker 16 together with a second pressure roll pair 19, 19'. The second pressure roller pair acts to press the band edges 11' against one another and consequently, firmly grips the workpiece 13'. When a program is to be changed, of course, both pressure roll pairs 3" and 3"' and 19 and 19' must be exchanged. Since the distance of the rolls 3" and 3"' and 19 and 19' from the workpiece axis 17 is different, their bearing pedestals 40 and 41, which are carried on the rocker 16, are mounted for displaceable movement in swallowtail guides 41.

The rocker 16 is mounted coaxially with the workpiece axis 17 in antifriction bearings 42 on bushings 43 which have bores 44 through which a workpiece 13' runs with spacing. The bushings 43 are fitted in bearing pedestals 45 which are displaceable on rails 46 in the direction of the workpiece axis 17. The construction is such that the rocker 16 can be introduced into the production line and removed therefrom with little expenditure of time.

In some instances, it is desirable that the band edges 11 and 11' be scanned by others means, for example, by pneumatically operable or optically operable scanning devices.

What is claimed is:

1. A device for forming welded tubes including forming means for forming a sheet into a tubular element having a longitudinal slot defined between edges of the formed sheet, electric sensing means including a separate sensor overlying but not contacting each edge of the formed sheet in a position to sense the location of the edges of the sheet as it is formed into a tube, a control connected to said sensing means and said forming means and responsive to the sensed locations of the sheet for shifting said forming means for varying the position of the edges as they are moved into said forming means to maintain a centering thereof in order to precisely position the slot, and an electron welding device overlying said tubular element and directing a precisely oriented welding beam into the slot to weld the edges together.

2. A welding device comprising feeding and forming means for feeding a sheet of material to form it into a slotted tube with spaced edges defining a longitudinally extending slot and including spaced rollers defining a nip therebetween into which said tube is fed, welding means forming a precisely positioned welding beam located above said nip in a position to weld the edges together, mounting means mounting said rollers for movement to vary the location of said nip, and contactless scanning means including a separate sensor overlying each edge of said tube at a spaced location before said nip in positions to sense the location of the edges of the sheet as it is formed into a tube, said scanning means being operatively connected to said mounting means for shifting said mounting means in response to the sensed location of said spaced edges to move the nip to maintain the centering of said longitudinal slot in respect to said welding beam during the feeding of said sheet material.

3. A welding device, according to claim 2, wherein said mounting means comprises a rotatable bracket carrying said rollers, an electric motor connected to said bracket for rotating said bracket for shifting said rollers and the nip therebetween transversely in respect to the longitudinal slot of the tube which is being formed.

4. A device, according to claim 1, wherein said forming means comprises a pressure roll set including spaced-apart first and second press rolls bearing against the workpiece on respective opposite sides, and means mounting said first and second pressure rolls for combined pivotal movement, said control including said mounting means.

5. A device, according to claim 4, including a rocker arm carrying said first and second pressure rolls, and means mounting said rocker arm for pivotal movement with said rolls about an axis which is substantially parallel to the axis of the tubular element which is formed.

6. A device, according to claim 5, including a second pressure roll set including a third and fourth rolls on respective opposite sides of the tubular element being formed and engaged with the element to urge the edges thereof into engagement for welding, all of said rolls being mounted on said rocker arm for pivotal movement with said arm about an axis substantially parallel to the axis of the tubular element being formed.

7. A device, according to claim 6, wherein said control includes a fluid pressure operated piston and cylinder combination, connected to said rocker arm for shifting said rocker arm with said rolls and in accordance with the migration of the seam of said tubular element.

* * * * *